Patented May 18, 1943

2,319,668

UNITED STATES PATENT OFFICE 2,319,668

HYGROSCOPIC SALT SOLUTION CONTAINING AN ARYL GUANIDINE INHIBITOR

Alvin M. Edmunds, Midland, Mich., assignor to The Dow Chemical Company, Midland, Mich., a corporation of Michigan No Drawing. Application June 14, 1941, Serial No. 398,118

8 Claims. (Cl. 23—89)

This invention relates to a composition and method for retarding the corrosion of ferrous metal surfaces by hygroscopic salt solutions. It also concerns hygroscopic salt solutions of reduced corrosiveness.

Concentrated solutions of hygroscopic salts, especially solutions of calcium and lithium halides, are adapted for use in a variety of industrial processes such as the dehydration of moist gases. However, since most such processes are carried out in steel apparatus, and since ordinary hygroscopic salt solutions sometimes tend seriously to attack ferrous metals, the use of such solutions occasionally gives rise to difficult operating problems, not only because the corrosive attack may shorten the useful life of the equipment but also because the products of corrosion may collect as solid deposits in the apparatus and impede the circulation of the hygroscopic solution.

A number of inhibitors for minimizing this corrosion have been suggested, but they are for the most part relatively ineffective, and often fail utterly when the hygroscopic solution is heated at temperatures above 200° F., in some cases even accelerating the rate of corrosion at these temperatures.

It has now been found, however, that the corrosion of ferrous metals by hygroscopic salt solutions may effectively be retarded, even at temperatures well above 200° F., by dissolving in the solution a small proportion of an aryl guanidine.

The use of aryl guanidine inhibitors according to the invention is directed principally to retarding the corrosion of ferrous metals by hygroscopic solutions essentially comprising a halide of at least one of the metals calcium and lithium, and is particularly effective in the case of solutions containing a substantial proportion of calcium bromide, or of both calcium bromide and calcium chloride. Typical hygroscopic solutions to which the invention has been successfully applied are strong calcium chloride brines, aqueous solutions of calcium chloride and glycerol, and aqueous solutions containing both calcium bromide and calcium chloride (U. S. Patent 2,033,934), and calcium bromide and lithium bromide (U. S. Patent 2,143,008).

The aryl guanidine inhibitor should, of course, be added to the hygroscopic solution in a concentration sufficient substantially to retard corrosion of ferrous metals, a concentration corresponding to 0.002 to 1.0 part by weight of aryl guanidine per 100 parts of solution ordinarily being satisfactory. In general, the inhibitor, either per se, in alcohol solution, or in the form of its hydrohalide salt, is added to the hygroscopic solution with vigorous agitation and if necessary with simultaneous application of heat. In so far as I have been able to determine, any aryl guanidine may be employed as an inhibitor according to the invention. However, the phenyl guanidines, and particularly diphenyl guanidine, are greatly to be preferred because of their unusually high effectiveness.

Aryl guanidine-containing hygroscopic solutions according to the invention may satisfactorily be employed in any process to which hygroscopic solutions are ordinarily placed. They are particularly advantageous in cyclic processes for dehydrating moist acid-containing gases, such as wet sulfide-containing natural gas, in which the hygroscopic solution is first passed into contact with the gas to remove moisture therefrom, after which the resulting diluted solution is regenerated by heating at temperatures well above 200° F. to drive off water. In such processes as ordinarily carried out, the hygroscopic solution soon becomes acid by contact with the gases being dried, often attaining a pH value as low as 3 to 4. As a result, the corrosion normally caused by the electrolytic action of the hygroscopic solution is aggravated by acidic corrosion from the dissolved acid and in consequence attack of the apparatus occurs with extreme rapidity, rendering further operation practically impossible after a comparatively short time. With the guanidine-containing solutions of the invention, however, even under these extreme conditions corrosion is reduced to a very low value, and continuous trouble-free operation is possible over long periods of time.

In those gas dehydration processes of the character just mentioned in which removal of water from the diluted hygroscopic salt solution at temperatures above 200° F. is accomplished by actually boiling the solution, an additional corrosion problem arises, viz. attack of those portions of the equipment which, although not in direct contact with the hygroscopic solution itself, are exposed to the vapors or spray of the boiling liquid. In such processes the use of aryl guanidine inhibitors according to the invention is particularly advantageous, since it has been found that the guanidine tends to volatilize during the boiling of the salt solution and functions as an inhibitor to retard corrosion of the equipment by the vapors and liquid spray as well as by the body of the boiling solution.

The following examples will serve further to illustrate the invention, but are not to be construed as limiting its scope:

Example 1

A weighed polished sample of mild steel was partially submerged for seven days in hygroscopic salt solution exposed to the air and maintained at a temperature of 200° F., the solution consisting essentially of 45.4 parts by weight of calcium bromide, and 8.59 parts of calcium chloride dissolved in 46 parts of water and having been adjusted to a pH value of 4.0 by the addition of a small quantity of hydrochloric acid. At the end of the test, the sample, the surface of which was somewhat pitted, was cleaned of corrosion products and reweighed. The observed loss in weight, referred to the submerged area of the steel sample, corresponded to a corrosion rate of 0.664 pound per square foot per year. In another test run under identical conditions except that the salt solution contained 0.5 per cent by weight of diphenyl guanidine, the steel sample was substantially unchanged and showed a loss in weight of only 8.5 per cent of that caused by the uninhibited hygroscopic solution.

Example 2

The tests of Example 1 were repeated, except that an atmosphere of natural gas containing hydrogen sulfide in a concentration of 2 grains per 100 cubic feet was maintained over the hygroscopic solutions during the tests. In this case, the corrosion rate of the steel sample submerged in the diphenyl guanidine-containing hygroscopic solution was only 2.7 per cent as great as that of the sample exposed to the uninhibited solution.

It is to be understood that the foregoing description is illustrative rather than strictly limitative of the invention, and that the latter is co-extensive in scope with the following claims.

I claim:

1. As a composition of matter, a hygroscopic salt solution essentially comprising a halide of at least one of the metals calcium and lithium and having dissolved therein as an inhibitor for retarding corrosion of ferrous metals a small proportion of an aryl guanidine.

2. A composition according to claim 1 wherein the aryl guanidine is a phenyl guanidine.

3. A composition according to claim 1 wherein the aryl guanidine is diphenyl guanidine.

4. As a composition of matter, a hygroscopic solution essentially comprising calcium bromide and having dissolved therein as an inhibitor for retarding corrosion of ferrous metals a small proportion of a phenyl guanidine.

5. As a composition of matter, a hygroscopic salt solution essentially comprising calcium bromide and calcium chloride and having dissolved therein as an inhibitor for retarding corrosion of ferrous metals a small proportion of diphenyl guanidine.

6. In a process wherein a hygroscopic salt solution essentially comprising a halide of at least one of the metals calcium and lithium is circulated in contact with ferrous metal surfaces, the method of retarding corrosion of such surfaces by the solution which comprises dissolving in the solution a small proportion of an aryl guanidine.

7. In a cyclic process of dehydrating moist acid-containing gas, during one step of which an acidic hygroscopic salt solution essentially comprising a halide of at least one of the metals calcium and lithium is heated at temperatures above 200° F. in contact with ferrous metal surfaces to drive off water from the solution, the method of retarding corrosion of the said surfaces by the heated acidic solution which comprises maintaining dissolved in the solution a small proportion of a phenyl guanidine.

8. In a process of dehydrating moist acid-containing gas, during one step of which an acidic hygroscopic salt solution essentially comprising calcium chloride is heated at temperatures above 200° F. in contact with ferrous metal surfaces to drive off water from the solution, the method of retarding corrosion of the said metal surfaces exposed to direct contact with the heated solution and with the vapor being driven off therefrom which comprises maintaining dissolved in the solution a small proportion of diphenyl guanidine.

ALVIN M. EDMUNDS.